(12) United States Patent
Bahl et al.

(10) Patent No.: US 10,437,796 B2
(45) Date of Patent: Oct. 8, 2019

(54) SCHEMA LIFECYCLE MANAGER

(71) Applicant: International Business Machines Corporation, Armonk, NY (US)

(72) Inventors: Rohit Bahl, Ottawa (CA); Samuel S. Lee, Irvine, CA (US); Adam R. Neal, Montreal (CA)

(73) Assignee: International Business Machines Coporation, Armonk, NY (US)

( * ) Notice: Subject to any disclaimer, the term of this patent is extended or adjusted under 35 U.S.C. 154(b) by 302 days.

(21) Appl. No.: 15/362,211

(22) Filed: Nov. 28, 2016

(65) Prior Publication Data

US 2017/0139957 A1  May 18, 2017

Related U.S. Application Data

(63) Continuation of application No. 14/944,025, filed on Nov. 17, 2015, now Pat. No. 9,535,934.

(51) Int. Cl.
| | |
|---|---|
| *G06F 16/21* | (2019.01) |
| *G06F 8/71* | (2018.01) |
| *G06F 16/23* | (2019.01) |
| *G06F 8/36* | (2018.01) |

(52) U.S. Cl.
CPC .............. *G06F 16/213* (2019.01); *G06F 8/36* (2013.01); *G06F 8/71* (2013.01); *G06F 16/214* (2019.01); *G06F 16/2365* (2019.01)

(58) Field of Classification Search
CPC ......... G06F 17/30297; G06F 17/30371; G06F 17/303; G06F 8/36; G06F 8/71; G06F 16/213; G06F 16/2365; G06F 16/214
USPC ........................................................ 707/810
See application file for complete search history.

(56) References Cited

U.S. PATENT DOCUMENTS

| | | | |
|---|---|---|---|
| 5,835,755 A | * | 11/1998 | Stellwagen, Jr. ........................... G06F 17/30445 707/764 |
| 6,026,408 A | | 2/2000 | Srinivasan et al. |
| 6,421,677 B1 | | 7/2002 | DeKimpe et al. |
| 6,453,322 B1 | * | 9/2002 | DeKimpe ......... G06F 17/30595 |
| 6,480,848 B1 | | 11/2002 | DeKimpe et al. |

(Continued)

OTHER PUBLICATIONS

Kolodziejski, M., Using an SQLite Database on Android Platform: Handling Database Structure Changes, posted Feb. 25, 2014, 5 pages, accessed online at <http://www.vertabelo.com/blog/technical-articles/sqlite-on-android-handling-database-structure-changes> on May 5, 2016.

(Continued)

*Primary Examiner* — Phuong Thao Cao
(74) *Attorney, Agent, or Firm* — Shumaker & Sieffert, P.A.

(57) ABSTRACT

Techniques are described for schema lifecycle management. In one example, a method includes dividing, with one or more processing devices, a plurality of statements of a data definition language (DDL) script into a plurality of groups, the plurality of groups configured to be executed in parallel by a persistence layer. The method further includes assigning, with the one or more processing devices, one or more of the plurality of groups to a plurality of worker applications. The method further includes executing, with the one or more processing devices, constituent statements of the plurality of statements of the DDL script within each group of the plurality of groups by the plurality of worker applications in a session.

20 Claims, 7 Drawing Sheets

(56) References Cited

U.S. PATENT DOCUMENTS

| | | | |
|---|---|---|---|
| 6,970,844 B1 | 11/2005 | Bierenbaum | |
| 7,003,560 B1 | 2/2006 | Mullen et al. | |
| 7,031,974 B1 | 4/2006 | Subramaniam | |
| 7,047,232 B1 | 5/2006 | Serrano | |
| 7,562,357 B2 | 7/2009 | Tamma et al. | |
| 7,676,492 B2 | 3/2010 | Bodily et al. | |
| 7,788,255 B2* | 8/2010 | Sethi | G06F 17/3056 707/713 |
| 7,882,498 B2 | 2/2011 | Ottoni et al. | |
| 8,122,066 B2* | 2/2012 | Castellanos | G06F 17/30306 707/713 |
| 8,195,621 B2 | 6/2012 | Elisha et al. | |
| 8,364,715 B2* | 1/2013 | Schoknecht | G06Q 10/067 705/323 |
| 8,458,201 B2 | 6/2013 | Pollinger | |
| 8,639,712 B2 | 1/2014 | Schmeink et al. | |
| 8,706,772 B2* | 4/2014 | Hartig | G06F 21/52 370/395.53 |
| 8,738,569 B1 | 5/2014 | Choi et al. | |
| 8,793,230 B2 | 7/2014 | Engelko et al. | |
| 8,869,136 B2 | 10/2014 | Chapman et al. | |
| 8,893,144 B2 | 11/2014 | Haham et al. | |
| 9,256,642 B2* | 2/2016 | Yu | G06F 16/24532 |
| 9,535,932 B1* | 1/2017 | DeSantis | G06F 16/21 |
| 2002/0133478 A1 | 9/2002 | Dionne et al. | |
| 2004/0122646 A1 | 6/2004 | Colossi et al. | |
| 2005/0060340 A1 | 3/2005 | Sommerfield et al. | |
| 2005/0188364 A1* | 8/2005 | Cockx | G06F 8/456 717/159 |
| 2005/0198630 A1 | 9/2005 | Tamma | G06F 8/65 717/175 |
| 2005/0262183 A1 | 11/2005 | Colrain et al. | |
| 2005/0289186 A1* | 12/2005 | Guo | G06F 17/30575 |
| 2006/0085465 A1 | 4/2006 | Nori et al. | |
| 2006/0100912 A1 | 5/2006 | Kumar et al. | |
| 2006/0195436 A1* | 8/2006 | Levesque | G06F 8/71 |
| 2007/0006194 A1* | 1/2007 | Mejri | G06F 11/3604 717/151 |
| 2007/0239774 A1 | 10/2007 | Bodily et al. | |
| 2008/0059468 A1* | 3/2008 | Bender | G06F 17/30442 |
| 2008/0301168 A1 | 12/2008 | Adler et al. | |
| 2008/0313610 A1 | 12/2008 | Ramsey et al. | |
| 2009/0198727 A1 | 8/2009 | Duan et al. | |
| 2009/0228527 A1 | 9/2009 | Wang | |
| 2010/0094829 A1* | 4/2010 | Castellanos | G06F 16/217 707/705 |
| 2010/0185701 A1 | 7/2010 | Ramamurthi et al. | |
| 2011/0066894 A1* | 3/2011 | Berlyant | G06F 9/5066 714/38.1 |
| 2011/0231853 A1* | 9/2011 | Murray | H04L 41/00 718/103 |
| 2011/0282896 A1* | 11/2011 | Kaila | G06F 17/3002 707/769 |
| 2011/0302151 A1 | 12/2011 | Abadi et al. | |
| 2012/0005188 A1 | 1/2012 | Yu et al. | |
| 2012/0005241 A1* | 1/2012 | Ortel | G06F 17/30294 707/803 |
| 2012/0023080 A1 | 1/2012 | Bolohan et al. | |
| 2012/0030192 A1 | 2/2012 | An et al. | |
| 2012/0030256 A1* | 2/2012 | Pfeifer | G06F 17/30554 707/810 |
| 2012/0036166 A1 | 2/2012 | Qiu et al. | |
| 2012/0110433 A1 | 5/2012 | Pan et al. | |
| 2012/0117547 A1* | 5/2012 | Balakrishnan | G06F 8/24 717/136 |
| 2012/0166423 A1 | 6/2012 | Milby | |
| 2012/0226658 A1 | 9/2012 | Connor | |
| 2012/0246179 A1 | 9/2012 | Garza et al. | |
| 2012/0297389 A1* | 11/2012 | Haham | G06F 8/445 718/102 |
| 2013/0060816 A1 | 3/2013 | Hui et al. | |
| 2013/0159353 A1* | 6/2013 | Fuh | G06F 11/3672 707/803 |
| 2013/0173541 A1 | 7/2013 | Iyer et al. | |
| 2014/0095432 A1 | 4/2014 | Trumbull et al. | |
| 2014/0143284 A1 | 5/2014 | McCaffrey | |
| 2014/0279840 A1 | 9/2014 | Chan et al. | |
| 2014/0310231 A1 | 10/2014 | Sampathkumaran et al. | |
| 2015/0006476 A1 | 1/2015 | Engelko et al. | |
| 2015/0012483 A1* | 1/2015 | Zheng | G06F 11/1464 707/607 |
| 2015/0019478 A1 | 1/2015 | Buehne et al. | |
| 2015/0149409 A1* | 5/2015 | Lee | G06F 17/30575 707/623 |
| 2015/0212999 A1* | 7/2015 | Alvey | G06F 16/221 715/227 |
| 2015/0347551 A1 | 12/2015 | Shang et al. | |
| 2015/0378696 A1 | 12/2015 | Boehm et al. | |
| 2016/0063050 A1 | 3/2016 | Schoen et al. | |
| 2016/0063063 A1* | 3/2016 | Tsai | G06F 17/30327 707/755 |
| 2016/0070644 A1* | 3/2016 | D'Sa | G06F 3/0611 711/5 |
| 2016/0217423 A1* | 7/2016 | Magnan | G06Q 10/103 |
| 2017/0031769 A1* | 2/2017 | Zheng | G06F 11/1446 |
| 2017/0097957 A1* | 4/2017 | Bourbonnais | G06F 16/24532 |

OTHER PUBLICATIONS

Martin et al., "Understanding Software Application Interfaces via String Analysis", In Proceedings of the 28th International Conference on Software Engineering (ICSE '06), 2006, pp. 901-904.

Redgate, "Solving the database deployment problem with Database Lifecycle Management (DLM)," Red Gate Software Ltd, 2015, 21 pp., retrieved between Feb. 3, 2015 and Feb. 23, 2015 from http://www.google.co.in/url?sa=t&rct=j&q=&esrc=s&source=web&cd=2&cad=rja&uact=8&ved=OCCoQFjAB&url=http%3A%2F%Fwww.red-gate.com%2Fassets%Fourcompany%2Fabout%2Fassets%2Fsolving-database-deploymentdlm.pdf.

Rational DOORS Next Generation, "Rational DOORS Next Generation 6.0" Jazz, Archived version dated Sep. 7, 2015 retrieved from https://web.archive.org/web/20150907175504/https://jazz.net/downloads/rational-doors-next-generation// on Nov. 16, 2015, 2 pp.

RainStor Inc., "Schema Evolution and Versioning," RainStor, Retrieved from http://rainstor.com/products/rainstor-database/store/schema-evolution/ on Nov. 3, 2015, 5 pp.

Fontaine, "Flyway—Evolve your Database Schema easily and reliably across all your instances," Flyway, Retrieved from http://flywaydb.org/ on Aug. 6, 2015, 6 pp.

Liquibase, "Database Refactoring—Source Control for Your Database," Liquibase, Retrieved from http://www.liquibase.org/ on Aug. 6, 2015, 3 pp.

Redgate, "The world's most trusted tools for shipping changes to your database," Redgate Software Ltd, Retrieved from http://www.red-gate.com/ on Aug. 6, 2015, 4 pp.

Prosecution History from U.S. Appl. No. 14/944,025, filed Nov. 17, 2015, from May 12, 2016 through Aug. 24, 2016 55 pgs.

U.S. Appl. No. 14/944,025, filed Nov. 17, 2015 by Rohit Bahl et al. 43 pgs.

List of IBM patents treated as related, Appendix P, 2 pgs.

* cited by examiner

SCHEMA LIFECYCLE MANAGER

This application is a Continuation of U.S. application Ser. No. 14/944,025, filed Nov. 17, 2015, the entire content of which is hereby incorporated by reference.

TECHNICAL FIELD

This disclosure relates to developer software.

BACKGROUND

Software applications written in object-oriented languages such as C++ and Java typically rely on a persistent layer for storing much of their state as well as data. Well-established databases perform the task of owning and delivering data to these software applications. One of the pieces of the data stores is the schema, which is a map defining the structure of the database. The structure of the database is described in a formal language supported by the database management system (DBMS) and refers to the organization of data as a blueprint of how the database is constructed. The schema is typically granulized to the column entities and tables in which to classify and store the data. In a relational database, the schema may define tables, fields, relationships, views, indexes, packages, procedures, functions, queues, triggers, types, sequences, materialized views, synonyms, database links, directories, XML schemas, and other elements.

Schemas are generally stored in a data dictionary. Although a schema is defined in a text database language, the term is often used to refer to a graphical depiction of the database structure. In other words, a schema is the structure of the database that defines the objects in the database.

SUMMARY

In one aspect of the disclosure, a method includes dividing a plurality of statements of a data definition language (DDL) script into a plurality of groups, the plurality of groups configured to be executed in parallel by a persistence layer. The method further includes assigning one or more of the plurality of groups to a plurality of worker applications. The method further includes executing constituent statements of the plurality of statements of the DDL script within each group of the plurality of groups by the plurality of worker applications in a session.

In another aspect of the disclosure, a computer program product includes a computer-readable storage medium having program code embodied therewith, the program code executable by a computing device to divide a plurality of statements of a data definition language (DDL) script into a plurality of groups, the plurality of groups configured to be executed in parallel by a persistence layer. The computer program product further includes program code to assign one or more of the plurality of groups to a plurality of worker applications. The computer program product also includes program code to execute constituent statements of the plurality of statements of the DDL script within each group of the plurality of groups by the plurality of worker applications in a session.

In another aspect of the disclosure, a computer system includes one or more processors, one or more computer-readable memories, and one or more computer-readable storage mediums. The computer system further includes program instructions, stored on at least one of the one or more storage mediums for execution by at least one of the one or more processors via at least one of the one or more memories, to divide a plurality of statements of a data definition language (DDL) script into a plurality of groups, the plurality of groups configured to be executed in parallel by a persistence layer. The computer system further includes program instructions, stored on at least one of the one or more storage mediums for execution by at least one of the one or more processors via at least one of the one or more memories, to assign one or more of the plurality of groups to a plurality of worker applications. The computer system further includes program instructions, stored on at least one of the one or more storage mediums for execution by at least one of the one or more processors via at least one of the one or more memories, to execute constituent statements of the plurality of statements of the DDL script within each group of the plurality of groups by the plurality of worker applications in a session.

The details of one or more embodiments are set forth in the accompanying drawings and the description below. Other features, objects, and advantages will be apparent from the description and drawings, and from the claims.

DETAILED DESCRIPTION

Figure 1:
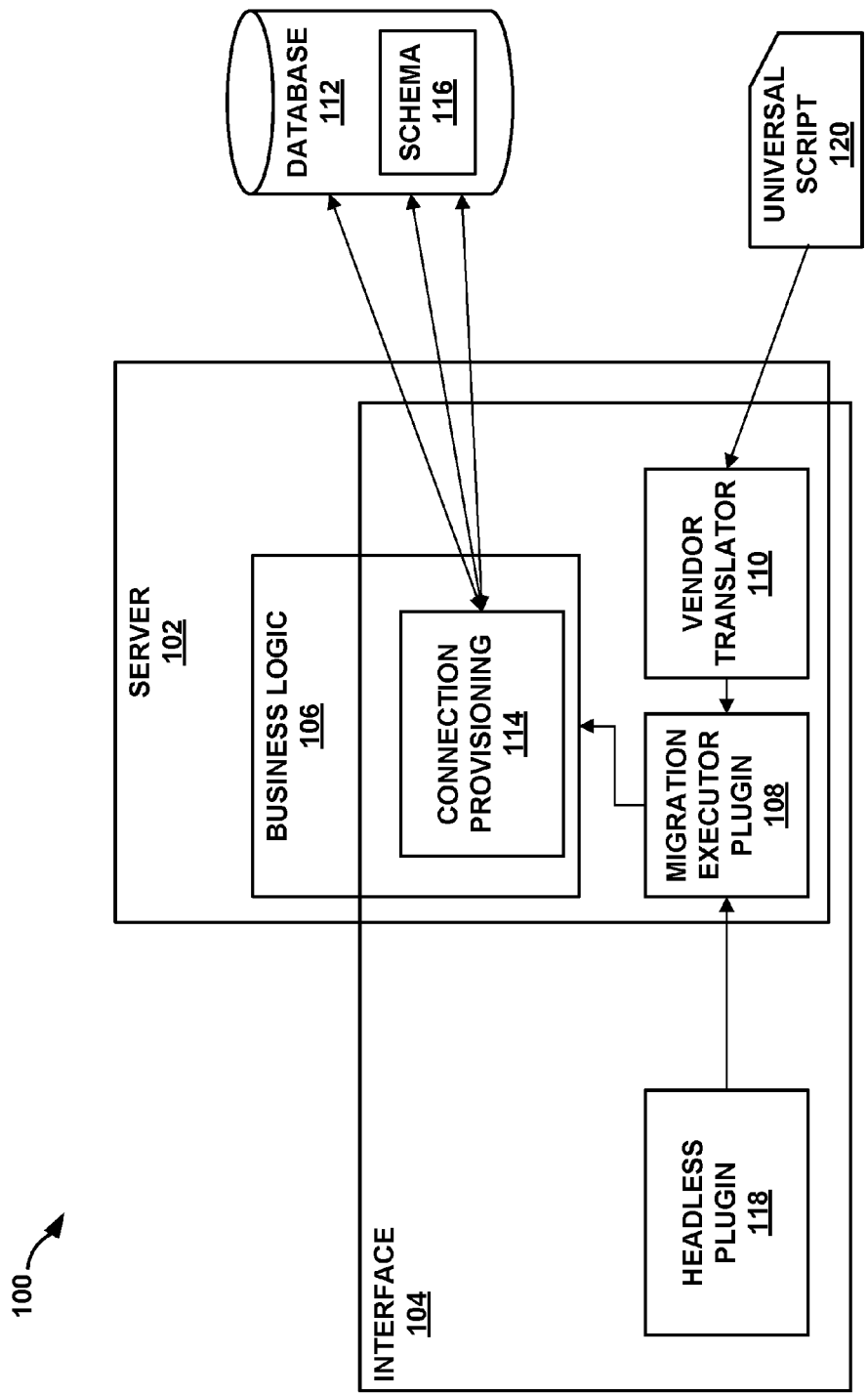
FIG. 1 is a block diagram of illustrating an exemplary system that provides an environment for schema lifecycle management.

There are set forth herein examples of a method, system, and computer program product for schema lifecycle management. Further implementations provide for the schema representing the database efficiently continuing to evolve together (e.g., lockstep) with the changing consuming software application. Various embodiments disclosed herein may enable a software application to remain in sync with its data store.

A significant piece of the data stores for many applications is the database schema, which defines the structure of the database granulized to the column entities and tables in which to classify and store the data. Business logic and requirements continue to morph as well as evolve, which in turn causes modifications in the software application. It is therefore easy for the software application to get out of sync with its data store. The present disclosure provides for the schema representing the database to efficiently continue to evolve together with the changing software application.

Schema lifecycle management includes a number of broad categories of activities including multiple increments, multiple vendors, development management, deployment and execution, and data upgrades. Multiple increments may include the concept that a software application may change on a frequent (e.g., daily) basis, and these changes may include changes to the database schema. This may result in a large number of incremental schema changes. Multiple vendors include the concept that customers of software applications may expect to adopt a database and vendor of their choice as the persistent layer to their application. Development management includes the concept of association of schemas with their associated business logic in a source control system, including in a scenario where there are multiple branches and parallel development streams. Deployment and execution includes the concept that ensuring that the coupling integrity between the business application and schema upgrade component continues to be maintained beyond just development artifacts, to encompass even the correct deployment as well as execution at runtime of these development artifacts. Data upgrades includes the concept that a newer schema implies migrating previously stored assets of customers, locked into databases, to new schemas, while preserving the customer's data.

To illustrate the magnitude of this development challenge, assume there are M schema increments (e.g., defects to be updated/schema versions) and each increment contains N structured query language (SQL) data definition language (DDL) statements (e.g., number of statements in each version) that further require being implemented on P databases (e.g., number of vendors that the underlying application may support). In this scenario, a total of M×N×P entities are required to be written. Databases require undergoing long upgrade cycles for transitioning through the various M×N SQL entities, in order to get the database evolved to its latest schemas. Risk of failing and aborting at an intermediary DDL during upgrade could result in leaving the data schema in an inconsistent state. Finally, management deployment of orthogonal technologies, e.g., DDL/SQL on the database that is hosted on a data server and C++/Java implemented business logic on the application server, may result in a potential mismatch in technology directives.

A migration tool is disclosed such as a migration executor plug-in (MEP) that may include a plug and play component where multiple different migration executors can be attached and detached to a business logic component, allowing multiple database connections to be borrowed for pre-emptively upgrading the associated scheme, using universal scripts, analyzed and optimized prior to their concurrent execution on the database in a contrived roll back context. The MEP may extend business application logic by updating the database schema to the required version. In one scenario, the business application validates the schema version that invokes the MEP, which serves a set of delta increments (e.g., schema increments) to bring the backend database schema up to date with the business application. The increments to be applied may be described in non-vendor specific pseudo DDL syntax, closely aligned with SQL DDL. This may allow the MEP to analyze the increments, optimize migration plans, and execute them concurrently. Various illustrative features and advantages of a schema lifecycle manager are further described below with reference to FIGS. 1-7.

FIG. 1 is a block diagram of illustrating an exemplary system 100 that provides an environment for schema lifecycle management. System 100 may include server 102. Server 102 may be a workstation, server, mainframe computer, notebook or laptop computer, desktop computer, tablet, smartphone, feature phone, virtual machine, or other programmable data processing apparatus of any kind. Other possibilities for server 102 are possible, including a computer having capabilities other than or beyond those described herein. Server 102 may include business logic 106, migration executor plugin (MEP) 108, and vendor translator 110.

Business logic 106 may include a software application. Business logic 106 may perform a variety of business functions. Business logic 106 may own or control database 112. Database 112 may reside on server 102 or reside as part of a separate entity. Business logic 106 may connect to database 112 via connection provisioning resource 114. Connection provisioning resource 114 may include one or more Java Database Connections (JDBC). Database 112 may include a relational database management system (RD-BMS) from any or from a variety of vendors including IBM® DB2, Oracle®, Apache® Derby®, and/or Microsoft® SQL server. Database 112 has a schema 116 that defines the structure of database 112 including the tables and columns within the tables of database 112. An update to the underlying business logic 106 may include an update to schema 116 of database 112 so that they are compatible and running the same version. This may ensure stability of business logic 106.

Server 102 is in communication with an interface 104. Interface 104 may include a command line interface or a graphical user interface (GUI). Interface 104 may reside outside of (and connect to) server 102 and may invoke MEP 108, via, e.g., headless plugin 118. Headless plugin 118 may include no GUI or may include a GUI.

MEP 108 may serve as an extension (e.g., an Open Service Gateway Initiative (OSGi) extension) to both server 102 and interface 104. MEP 108 may be a pluggable component that can latch on to business logic 106, extending the capability of performing an upgrade of schema 116. MEP 108 may be developed independently of business logic 106. This may remove the constraint of business logic 106 from maintaining MEP 108. MEP 108 may have no requirement of storing or maintaining credentials in database 112. Connections to database 112 may be borrowed directly from the caller business logic 106. MEP 108 also may also be configured to work with older business logic 106 deployments. The deployed MEP 108 may be newer than the business application version by only upgrading the version of schema 116 to meet the version of business logic 106. This may be the case even if there are newer schema updates available.

MEP 108 may extend server 102 by allowing itself to be invoked at runtime from business logic 106. Business logic 106 may then delegate the task of upgrading schema 116 of database 112 to MEP 108. MEP 108 may extend headless plugin 118 by allowing MEP 108 to be invoked from interface 104 via, e.g., a command line. This allows MEP 108 to be invoked while server 102 is offline. Thus, business logic 106 does not need to be currently running to invoke MEP 108 and update schema 116.

In an alternative embodiment, MEP 108 may plug into an integrated development environment (IDE) including, e.g., Eclipse. MEP 108 may plug into the IDE via an OSGi extension. MEP 108 may then be invoked from inside the IDE. The IDE may alternatively invoke MEP 108 via the command line and headless plugin 118.

In any of various ways MEP 108 is invoked (e.g., directly from business logic 106, from an IDE, and/or via interface 104 and headless plugin 118), connections to database 112 may be handled via connection provisioning 114 portion of business logic 106. Alternatively, MEP 108 may handle connections to database 112 or utilize a third party program or service to access database 112. It is via the connections to database 112 that schema 116 may be updated (by MEP 108).

Universal script 120 may be utilized to effectuate the update of schema 116 by MEP 108. Universal script 120 may be in a singular language that is vendor implementation neutral. Universal script 120 may contain a listing of the cumulative incremental schema revisions associated with MEP 108. The cumulative incremental schema revisions may be written in a pseudo DDL (e.g., a universal or vendor agnostic DDL) or may be in one or more specific vendor implemented DDLs. Universal script 120 may include a compressed, bundled, and/or archive (e.g. ZIP) file or a single or multiple individual files. Universal script 120 and/or the single or multiple individual files may be written in an extensible markup language (XML). One or more vendor translators 110 may be utilized to ensure that universal script 120 is disambiguated and translated into vendor specific implementation languages. This may allow each translation to put the pseudo DDL into the correct syntax for the particular implementation. Thus, a single true copy of the pseudo SQL may be written and shared amongst one or more databases from a variety of vendors.

In development environments, the developer workspace may be running the latest version of MEP 108 available (e.g., a version of MEP 108 that contains the latest schema version). This latest version may be available via, e.g., a third party source control system (e.g., Rational Team Concert) that may perform source control management (SCM). This latest version may include test (e.g., alpha or beta test) or pre-release versions of MEP 108. This may allow the latest copy to be committed into a source code repository along with any branched or head version of business logic 106. This may allow for a mismatch in code released for the business logic 106 (e.g., by a user of business logic 106) versus the delivered version of schema updates contained in the universal script 120 and in turn MEP 108 (e.g., which may contain schema updates for unreleased/test software as well as for earlier released versions). In other words, universal script 120 may contain a number of different versions of the underlying schema updates, including versions after (or an upgrade to) the underlying version of business logic 106. These greater versions may be test (e.g., alpha or beta) versions of schema 116 to work with test or unreleased versions of business logic 106. Thus, as long as the version to be used (which may be contained in MEP 108) is greater than the version of business logic 106, an upgrade may occur. Thus, there may be more schema versions in universal script 120 than is needed to fully update database schema 116 to the corresponding version of business logic 106. In an alternative, MEP 108 may update schema 116 to the highest level available, even if it is greater or less than the version of the corresponding business logic 106.

Thus, MEP 108 may divide a plurality of statements of a data definition language (DDL) script into a plurality of groups, the plurality of groups configured to be executed in parallel by a persistence layer 112. MEP 108 may also assign one or more of the plurality of groups to a plurality of worker applications. MEP 108 may also execute constituent statements of the plurality of statements of the DDL script within each group of the plurality of groups by the plurality of worker applications in a session.

Figure 2:
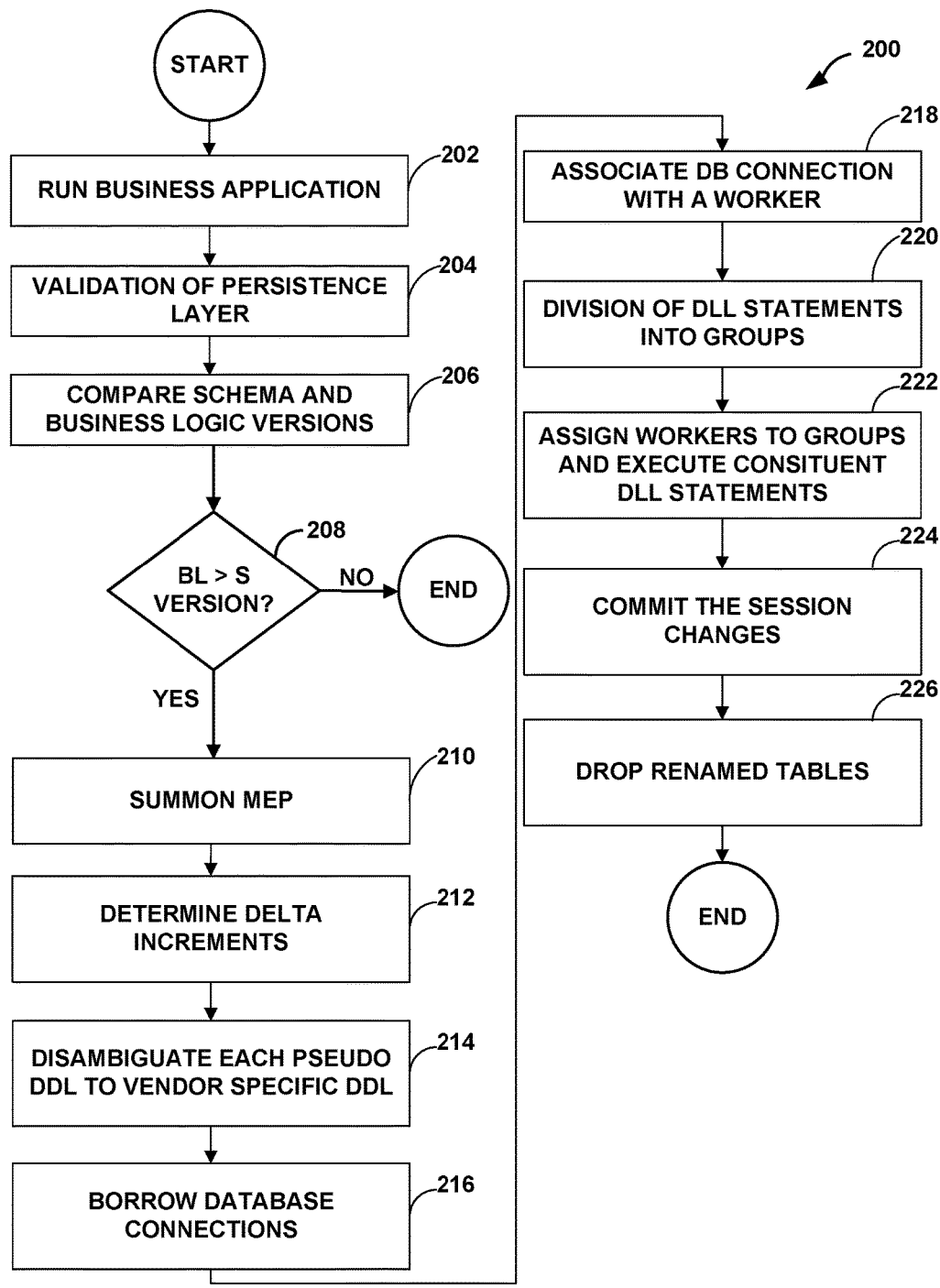
FIG. 2 is a flowchart illustrating operation of a method for updating a database schema, according to an illustrative example.

FIG. 2 is a flowchart illustrating operation of a method for updating a database schema, according to an illustrative example. Method 200 may be implemented in in executable instructions stored as part of program code, which may be stored in persistent data storage 88, loaded into memory 86 and executed by processor unit 84 of FIG. 7, according to an illustrative example. Method 200 may be performed by a computing device, such as server 102 of FIG. 1 which is an example of computing device 80 of FIG. 7, including by one or more processors of a computing device carrying out computer-executable instructions which may be referred to here as being performed by a computing device.

Server 102 may run business logic 106 (202). Business logic 106, running on server 102, may validate the persistence layer (e.g., database 112) of business logic 106 (e.g., database 112) (204). Server 102 may then compare the version of schema 116 of database 112 and the version of business logic 106 (206). If the version of business logic 106 is not greater than the version of schema 116, the method ends (208, no branch). If the version of business logic 106 is greater than the version of schema 116 (208, yes branch), business logic 106 may request a migration application (e.g., Migration Executor Plugin (MEP) 108) (210).

In an alternative example, MEP 108 may be called from interface 104 outside of server 102. In this example, MEP 108 may be called from headless plugin 118 running from a command line.

MEP 108 may determine a range of delta increments between the version of business logic 106 and the version of schema 116 of the persistence layer from a universal DDL script (e.g., universal script 120) (212). The delta increments may include the schema updates from the current version of schema 116 to the version of business logic 106. Universal script 120 may include multiple schema update versions, including versions that are greater than the version of business logic 106. In such an instance, MEP 108 may utilize only the versions to update schema 116 to the version of business logic 106. Thus, there may be no requirement to keep the version of business logic 106 and MEP 108 schema in absolute sync.

Universal script 120 may include statements in a pseudo (vendor agnostic) DDL. Vendor translator 110 running on server 102 may translate/disambiguate the universal DDL to a vendor specific DDL (214). The vendor specific DDL may correspond to a DDL associated with the persistence layer. The translation/disambiguation may translate from universal script 120 to vendor specific valid syntax. MEP 108 may borrow one or more database connections to database 112 from business logic 106 on server 102 by the migration application (e.g., MEP 108) (216). The database connections borrowed may be a configurable number of connections. The database connections may utilize connection provisioning service 114 of business logic 106. This may allow MEP 108 the ability to distance itself from managing database credentials. In such an example, business logic 106 (and the connection provisioning service 114) may instead store or utilize database credentials. In an alternate example, MEP 108 may manage database connections and credentials all within plug-in 108. Additionally, statements to delete (e.g., drop) a table may be converted into statements to rename the table and then delete (e.g., drop) the tables at the end of the process. This may allow locks on database 112 to be bypassed.

Each of the database connections may be associated with a worker process/application by MEP 108 (218). The worker processes may be controlled by MEP 108 and MEP 108 may also configure the worker processes to execute and process the DDL statements to alter and update schema 116 of database 112. The workers may be responsible for conducting parallel DDL execution.

The DDL statements may then be divided into one or more groups by MEP 108 (220). For example, the vendor specific DDL may be divided into a plurality of groups by MEP 108. The plurality of groups may be configured to be executed in parallel by the persistence layer. These groups may be analyzed and optimized by MEP 108. Such analyzation and optimization may be accomplished in such a way as to allow them to be processed in parallel by separate workers. This may allow for concurrent rewrites that leverage multiple connections and may bring schema 116 of database 112 up to date faster. The division may also work to remove conflicting DDL statements across groups (e.g., a DDL statement in one group adding a table and then another DDL statement in another group dropping the table). The division of DDL statements across groups allows for the breaking up of quantum schema revisions (e.g., versions) into micro-level (e.g., individual) statements.

In response to the DDL statements being separated into groups, each worker application of the plurality of worker applications may be assigned to one or more of the plurality of groups by MEP 108 (222). Constituent statements of the plurality of statements of the vendor specific DDL within each group of the groups in a session may be executed by the worker applications (via MEP 108). The groups may be organized into an ordered list. Statements in the ordered list may be executed before the next statement in the ordered list. The workers (via MEP 108) may each have a constant binding to a database connection. The execution of the DDL statements, at database 106, by each worker (via MEP 108) may occur in an uncommitted state. This may allow for the rolling back of any or all of the changes made until the changes are committed (which may occur at the completion of the update). The workers (via MEP 108) may select a new (optimized and analyzed) group and execute the constituent DDLs. The selection may occur randomly. The selection of a particular group by a worker at a particular time may not affect the outcome of the process as the workers may run independently. Alternatively, the selection may occur in a preordered fashion or from a sort by number of statements, statement complexity, and efficiency of the worker or database connection. The DDL statements may be executed via the connections to database 112 from the connection provisioning server 114 of business logic 106.

After each of the DDL statements in each of the groups has been executed, the session may be committed by the worker applications (via MEP 108) (224). Committing the changes may be based, at least in part, on the executing. This may allow a rollback of the entire migration process if an error occurs. Such errors may include a syntax error in a DDL statement, a problem with a connection to database 112 such as running out of connections, and/or a problem with database 112 such as a hard drive running out of disk space during the processing of the groups by the workers. Executing DDL instructions in a non-committal transaction may allow implicit rollback, unlike reverse DDL to mimic rollback. Hence, in such an example, either the migration occurs in entirety to the target version or not at all in the event of an error. If any tables were renamed during the course of schema 116 upgrade, the original tables may then be dropped following the committing of the changes by the worker applications (226).

Figure 3:
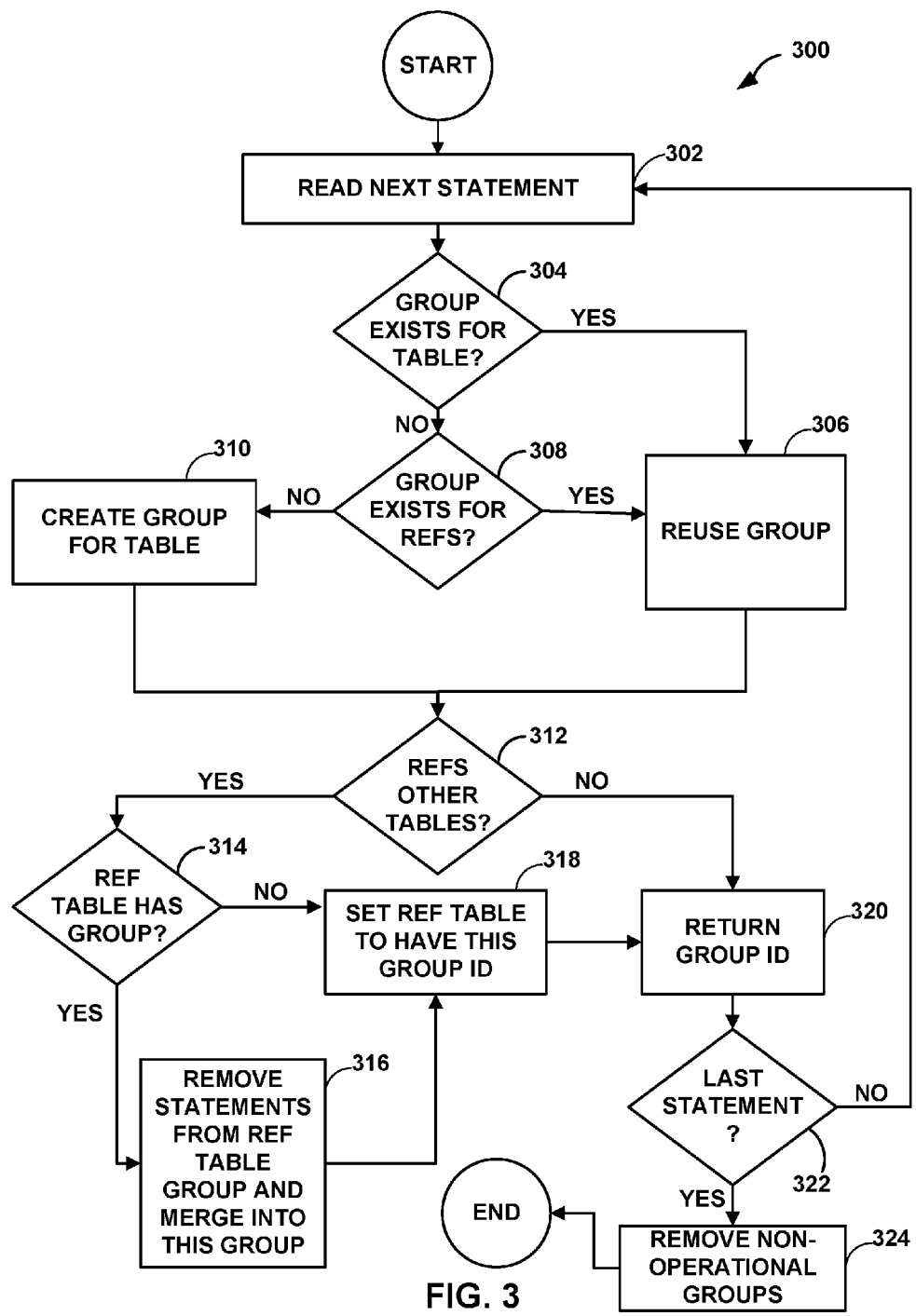
FIG. 3 is a flowchart further illustrating the division of DDL statements into groups of FIG. 2, according to an illustrative example.

FIG. 3 is a flowchart further illustrating the division of DDL statements into groups of FIG. 2, according to an illustrative example. Method 300 may correspond to an exemplary implementation of step 220 of FIG. 2. Method 300 may be implemented in executable instructions stored as part of program code, and which may be stored in persistent data storage 88, loaded into memory 86 and executed by processor unit 84 of FIG. 7, according to an illustrative example. Method 300 may be performed by a computing device, such as server 102 of FIG. 1 which is an example of computing device 80 of FIG. 7, including by one or more processors of a computing device carrying out computer-executable instructions which may be referred to here as being performed by a computing device.

The next DDL statement (or schema node) may be read from the universal script 120 or via vendor translator 110 (302) by MEP 108. The DDL statement may be in a pseudo (e.g., vendor agnostic) DDL or in a translated vendor specific DDL. For the statement, MEP 108 determines whether a group exists for the table name (304). If a group already exists (304, yes branch), the group that already exists is reused for the current statement, by MEP 108 (306). If no group exists (304, no branch), MEP 108 determines whether a group already exists that reference the present table (308). If a group already exists from statements that reference the present table (308, yes branch), that already existent group is reused (306). If no current statements reference the current table, (308, no branch), a group is created for the table by MEP 108 (310).

After a group is created (310) or reused (306), the method 300 determines whether the statement references other tables (312). If the statement does not reference other tables (312, no branch), the group identifier is returned by MEP 108 (320). If the statement does reference other tables (312, yes branch), for each reference, whether the referenced table has a group already is determined by MEP 108 (314). If a referenced table does not already have a group (314, no branch), the referenced table is then set to have this group identifier by MEP 108 (318). If a referenced table already has a group (314, yes branch), then the statements from the referenced table group are removed from that group and merged into the currently described group by MEP 108 (316). The referenced table is then set to have this group identifier by MEP 108 (318). The group identifier is then returned by MEP 108 (320). If the present statement is not the last statement (or schema node), the method 300 continues with the next statement (322, no branch).

If the present statement is the last statement (or schema node), the method 300 will remove all non-operational groups (324). Non-operational groups include groups where tables are manipulated (created, altered, columns added or altered) and then the table is deleted (e.g., dropped). Additionally, individual statements within a group may be removed as well, such as if a column is created and then removed (e.g., dropped). If there are no more statements left in the group, the group is removed as non-operational.

Figure 4:
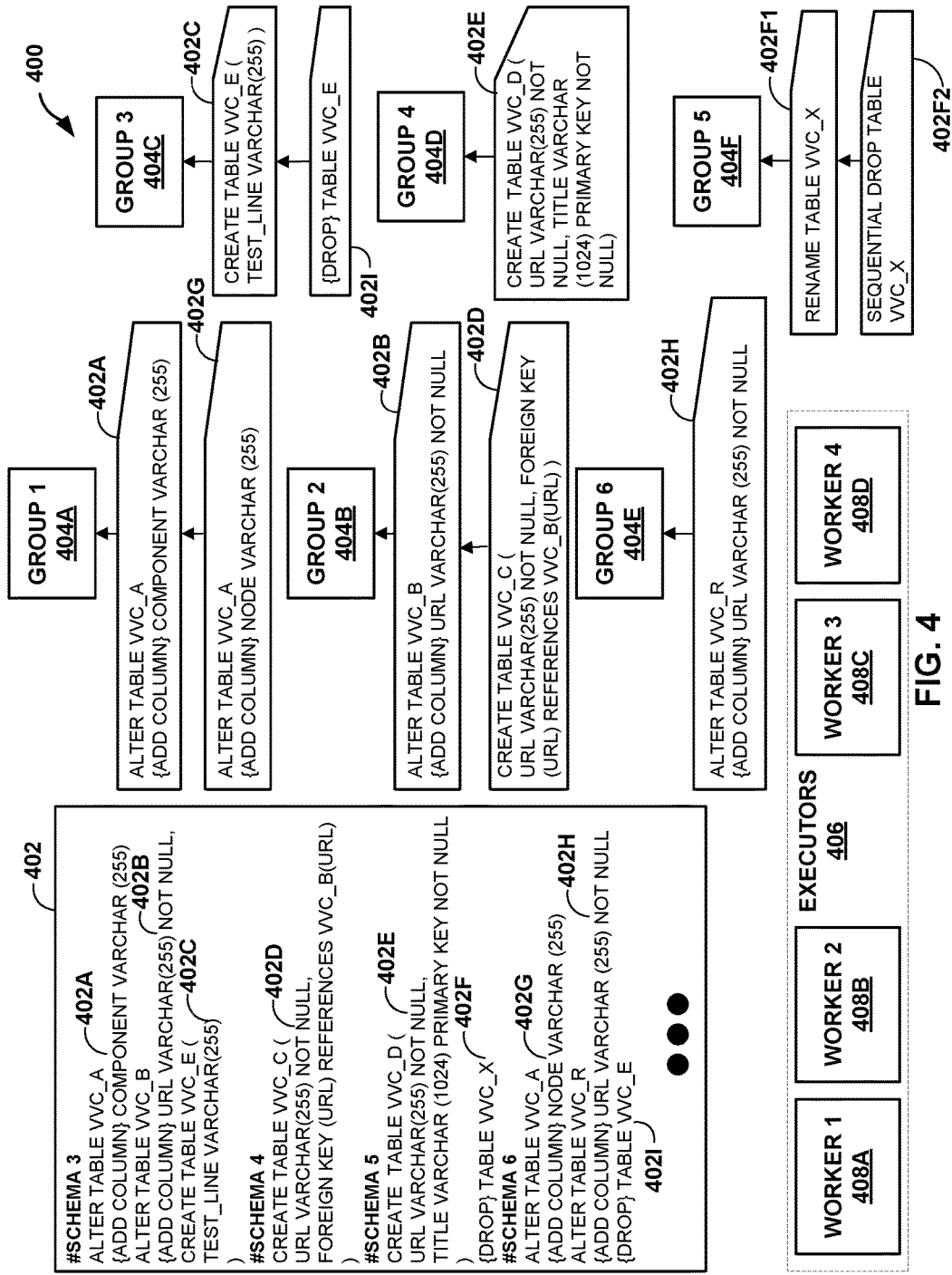
FIG. 4 is a block diagram illustrating an exemplary implementation of updating a database schema as described in FIGS. 2 and 3, according to an illustrative example.

FIG. 4 is a block diagram illustrating an exemplary implementation of updating a database schema as described in FIGS. 2 and 3, according to an illustrative example. Exemplary system 400 illustrates a scenario walking through the updating of a database schema 116. In this example, the version of database schema 116 is 2, the version of business logic 106 is 6, and the version of MEP 108 and universal script 120 is 20.

When a user runs business logic 106, business logic 106 validates a persistence layer of business logic 106 (e.g., database 112) and compares the version of schema 116 (i.e., 2) with the version of business logic 106 (i.e., 6). Because the version of business logic 106 is greater than the version of schema 116, MEP 108 is called either by business logic 106 or via the interface 104 (and, e.g., headless plugin 118). MEP 108 will retrieve Universal DDL 402 with 20 schema versions included and will determine the delta increments. In this case, MEP 108 may determine that schema versions 3 through 6, inclusive, and excluding versions 7 through 20, are the delta increments (e.g., DDL statements) to be used to upgrade schema 116. In an alternative example, Universal DDL 402 may also exclude versions 1 and 2. Schema versions 3 through 6 should be executed to upgrade schema 116 version to that of business logic 106 (i.e., so that they are both 6).

Universal DDL 402 may be an exemplary universal script 120. Universal DDL 402 may include an excerpt of an exemplary Universal DDL written in a pseudo-DDL, where curly braces surround macros that may be changed by a translator 110 into a vendor specific DDL with valid syntax. Therefore, the universal DDL may only need to be written once per platform. The universal DDL may be closely aligned with SQL which may ease adoption.

MEP 108 borrows a pre-selected number of connections (i.e., 4 in this case) to database 112 from business logic 106 via the connection provisioning service 114. This allows MEP 108 to distance itself from managing database connections and credentials directly. Each of the four borrowed connections is associated with an executor 406 via workers 408A-D by MEP 108. Each worker 408A-D may conduct parallel DDL execution by working on separate optimized groups.

Each of the statements in the delta increments (e.g., schema 3-6) are analyzed and optimized by MEP 108. MEP 108 reads each statement in sequential order starting with statement 402A "ALTER TABLE VVC_A {ADD COLUMN} component varchar (255)," since no groups have been created nor are there references to other tables in table VVC_A, Group 1 404A is created and is set to have table VVC_A statements placed in it by MEP 108. The placement of that first statement into Group 1 404A is via a linked list of statements, though, MEP 108 may utilize any data structure including e.g., an array and a matrix.

MEP 108 may then attempt to categorize the next statement 402B, "ALTER TABLE VVC_B {ADD COLUMN} url varchar(255) NOT NULL." Since Table VVC_B is not associated with a group and has no known references and has not been referenced by other tables, a new group is created and the Group ID is returned by MEP 108 (e.g., Group 2 404B). As is shown, even though both statements 402A and 402B are part of schema 3 in universal DDL 402, the statements are separated into different groups and thus may be run in parallel by the workers 408A-D via MEP 108. This may speed up the processing of the update of database schema 116 due to the parallel processing.

Similarly, with respect to the third statement 402C, "CREATE TABLE VVC_E (test_line varchar(255))" table VVC_E has not been added to a group and no group exists that references Table VVC_E and table VVC_E references no other group, thus a new group is created and returned by MEP 108 (Group 3 404C).

The fourth statement 402D, "CREATE TABLE VVC_C (url varchar(255) not null, FOREIGN KEY (url) REFERENCES VVC_B (url))" does not currently have a group assigned to the table, and no group currently references Table VVC_C. But, Table VVC_C, however, references Table VVC_B in statement 402D which is assigned a group (i.e., Group 2 404B). The statements from VVC_B in Group 2 404B are merged with this group into Group 2 404B, which is returned for statement 402D by MEP 108.

With respect to the fifth statement 402E, "CREATE TABLE VVC_D (url varchar(255) NOT NULL, title varchar (1024) PRIMARY KEY NOT NULL)," table VVC_D has not been added to a group and no group exists that references Table VVC_D and no table VVC_D does not reference another table, thus a new group is created and returned by MEP 108 (Group 4 404D).

With respect to the sixth statement 402F "{DROP} TABLE VVC_X" table VVC_X has not been added to a group and no group exists that references Table VVC_X and no previous statement has referenced Table VVC_X, thus a new group is created and returned by MEP 108 (Group 5 404F). Thus, statement 402F changes into two distinct statements 402F1 and 402F2 in Group 5 404F. Table VVC_X will first be renamed (statement 402F1), then, at the end of the execution of the statements and changes committed, the table VVC_X (including whatever table VVC_X is renamed) may be dropped by MEP 108 (statement 402F2).

With respect to the seventh statement 402G "ALTER TABLE VVC_A {ADD COLUMN} node varchar (255)" table VVC_A has been added to a group previously (Group 1 404A), no group exists that references table VVC_A, and table VVC_A references VVC_A, thus statement 402G is placed in Group 1 404A and that group 1 404A is returned by MEP 108. Thus, since multiple statements (from multiple schema versions, i.e., schema 3 and 6) reference table VVC_A in the Universal DDL contentious locking may occur if the statements are run independently.

With respect to eighth statement 402H, "ALTER TABLE VVC_R {ADD COLUMN} url varchar (255) NOT NULL," table VVC_R has not been added to a group and no group exists that references Table VVC_R and table VVC_R references no other tables, thus a new group is created and returned by MEP 108 (Group 6 404E).

With respect to the eighth statement 402I, "{DROP} TABLE VVC_E," table VVC_E has been added to a group (Group 3 404C) previously, no group exists that references Table VVC_E and table VVC_E references no other tables, thus Group 3 404C is returned by MEP 108.

As statement 402I was the last statement in the Universal DDL that is being used to update schema 116, all non-operational groups may be removed by MEP 108. In this case, each group is analyzed to determine whether counteracting statements are set to be run by MEP 108. In this case Group 3 404C contains statements 402C and 402I which purport to create and drop table VVC_E. Since running these two statements may effectively be non-operational the statements may be removed. Furthermore, since there are no operational statements in Group 3 404C, Group 3 404C may be removed in its entirety. Thus, Groups 1, 2, and 4-6 404A, B, and D-G remain operational.

The statements 402A-I may begin to be executed by the executors 406. Workers 408A-D with their current database connection bindings may randomly pick up the optimized groups and execute their constituent DDLs. A strict affinity may be maintained between the worker/database session and the group it undertakes. Therefore, all DDLs for a group may be handled by a single worker. In response to a worker finishing executing a particular group, the worker may then be assigned another group to execute by MEP 108. For example, Worker 2 408B may be assigned Group 6 404E. If worker 2 404B completes the execution of Group 6 404E, worker 2 404B may be assigned Group 4 404D to execute.

If an error occurs during the dropping of a table, one of two scenarios may occur. If a user permissions error occurred (e.g., the user didn't have the permissions to execute the DROP command and may need to be granted permission), once permissions have been granted (or different credentials issued), the DROP commands may be rerun by MEP 108. If a data integrity issue occurred that is preventing the DROP from being carried out, MEP 108 may restore a backup version of database 112 and run the update again. The DDL script may be fixed in the interim between the restoration of the backup version of database 112 and the running of the update again. MEP 108 may be updated in the interim period with a different version of MEP 108 and the universal DDL 120.

After all of the (operational) groups have been exhausted, the workers 408A-D may commit each of the sessions. After committing the changes in database 112, the workers 408A-D may drop the renamed tables (e.g., table VVC_X in statement 402F2). Before the sessions are committed by the workers 408A-D, the entire migration process may be rolled back if an error occurred executing any of the statements due to, e.g., running out of disk space on the server, running out of connections for the workers 408A-D, or if a statement with one or more syntax errors are encountered by MEP 108. The failed statement may automatically abort the entire upgrade in an uncommitted state.

Figure 5:
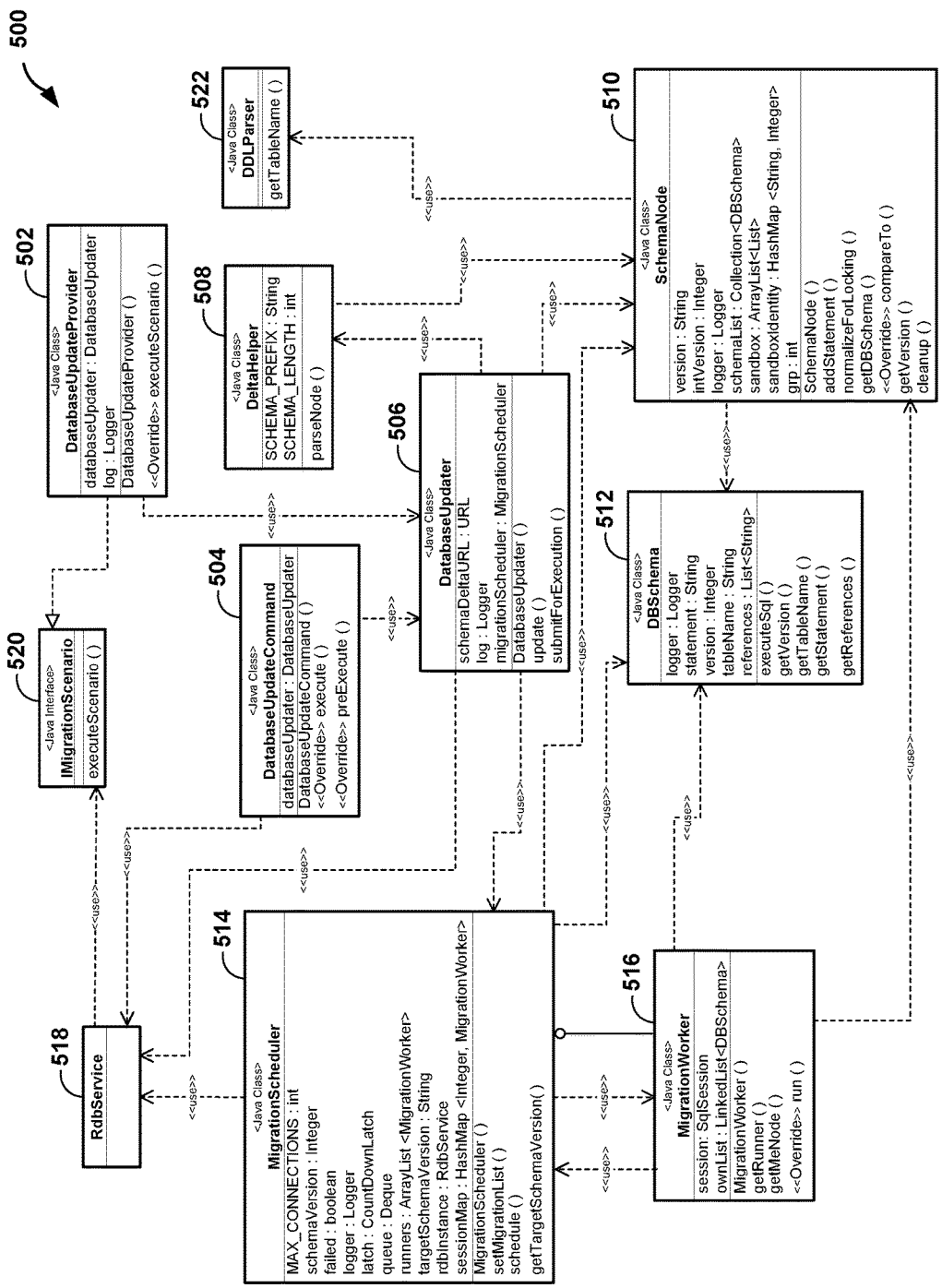
FIG. 5 illustrates an exemplary Unified Modeling Language (UML) diagram for exemplary classes to perform schema lifecycle management.

FIG. 5 illustrates an exemplary Unified Modeling Language (UML) diagram 500 for exemplary classes to perform schema lifecycle management by MEP 108. While disclosed in terms of Java classes, implementation of the UML diagram may be done in any language.

DatabaseUpdateProvider 502 may define an OSGi extension point and may automatically get invoked by business logic 106 to handle schema 116 upgrade. The OSGi extension point may allow for an IDE (e.g. Eclipse) to automatically update schema 116. DatabaseUpdateProvider 502 may utilize IMigrationScenario 520 to provide an interface to define the extension point. DatabaseUpdateProvider 502 may utilize an executeScenario method to start the updating process. DatabaseUpdateCommand 504 may define an OSGi extension point and may facilitate invocation of MEP 108 to work in headless mode (via headless plugin 118). DatabaseUpdateCommand 504 may define one or more methods (e.g., execute and preExecute) to invoke the updater (such as DatabaseUpdater 506). DatabaseUpdateProvider 502 and DatabaseUpdateCommand 504 may be two entry points to invoke MEP 108 and schema 116 updater.

DatabaseUpdater 506 may allow MEP 108 to discover the schema version of database 112 as well as the version of business logic 106. DatabaseUpdater 506 may also orchestrate parsing of the universal script 120 and may submit these DDL statements of universal script 120 to the queue. DatabaseUpdater 506 may include the location of universal script 120 (in a URL datatype called schemaDeltaURL). DatabaseUpdater 506 may also include a method (update) to begin the process of parsing DDL statements using DeltaHelper 508 to divide the DDL statements into groups. DatabaseUpdater 506 may include a method to begin the process of executing the update (submitForExecution).

DeltaHelper 508 may be responsible for parsing the universal script 120 containing delta increments. DeltaHelper 508 may load the delta increments into SchemaNode 510 data structures. DeltaHelper 508 may go through the DDL file and make new SchemaNode 510 data structures whenever it encounters a #Schema tag. DeltaHelper 508 may ensure that only those schema versions are selected that fall in the interval of the present version of database 112 and the target business logic 106 version to which the database will be upgraded to. DeltaHelper 508 may also invoke the vendor translators 110 that may provide macro substitution and may ensure that the DDL statements are transformed into valid vendor specific DDL syntax. DeltaHelper 508 may also include a SCHEMA_PREFIX string and SCHEMA_LENGTH integer delineating a prefix that may need to be appended to DDL statements and the length of the prefix, respectively.

SchemaNode 510 is a class representing individual schema revisions. SchemaNode 510 may break up individual DDL statements into groups to normalize the groups for locking. SchemaNode 510 may create one or more DBSchema 512 instantiations, in a collection of DBSchema 512 called schemaList, containing each of the DDL statements. SchemaNode 510 may store the collection in a sandbox. SchemaNode 510 may utilize a parameter with schema 116 version in both string and integer types (version and intVersion). SchemaNode 510 may compare schema versions via a compareTo method. SchemaNode 510 may utilize methods to return specific variables (e.g., getDBSchema, to return the schemaList which may include the set of DDL statements for the schema revision/version number, and getVersion, to return the version). SchemaNode 510 may include a method to determine which groups may be run independently (as, e.g., shown in FIGS. 3 and 6) pending schema 116 update (normalizeForLocking). SchemaNode 510 may include a mapping (e.g. a HashMap) of table names and group identifiers (grp, which may be an index in the sandbox counter) (sandboxIdentity). SchemaNode 510 may utilize a cleanup method to clean up the memory used by the sandbox. SchemaNode 510 may utilize the DDLParser 522 to parse individual DDL statements via an addStatement method. DDLParser 522 may retrieve table information (via a getTableName method) and return a list of other tables referenced within the DDL statement.

DBSchema 512 may store an individual DDL statement to be executed atomically and is instantiated by SchemaNode 510. Each instance of DBSchema 512 may include parameters such as the DDL statement (statement), a schema version denoting which schema update version the DDL statement belongs (version), the table name that is being changed via the DDL statement (tableName), and a list of references made in the DDL statement (references), if any. For example, if there is a reference to another table as a column in the table is a foreign key to another referenced table. DBSchema 512 may also include methods to return the variables (e.g. getVersion, getTableName, getStatement, and getReferences) and a method to execute the statement (executeSql).

MigrationScheduler 514 may line up various DBSchema 512 DDL statements for concurrent execution (e.g., groups). At instantiation, MigrationScheduler 514 may get an instance of the RdbService 518 and initialize variables/parameters. MigrationScheduler 514 may send off individual DBSchema 512 DDL statements to the various executors/workers (as shown in MigrationWorker 516 that may be stored as runners in an array list of MigrationWorker 516). MigrationScheduler 514 may include a parameter called MAX_CONNECTIONS that delineate the maximum number of connections (and thus the maximum number of parallel workers, such as MigrationWorker 516) that may be used. The connections to the database may utilize the connections of RDBService 518 up to the maximum number of connections. MigrationScheduler 514 may also commit all the Java Database Connectivity technology (JDBC) connections after all the DDL statements have been successfully completed execution (by MigrationWorkers 516). MigrationScheduler 516 may also have a session mapping (sessionMap) of MigrationWorkers 516 and group identifiers.

This may ensure that only one worker handles a group. MigrationScheduler 514 may store a current version of schema 116 (as a schemaVersion property) and a target version of schema 116 (as a targetSchemaVersion property). MigrationScheduler 514 may receive the target schema version using the getTargetSchemaVersion method. MigrationScheduler 514 may include a queue of all DDL statements in order. MigrationScheduler 514 may also handle sequential tasks such as deleting renamed tables that require exclusive access. MigrationScheduler 514 creates and manages MigrationWorkers 516 and assigns MigrationWorkers 516 groups of DDL statements to execute. MigrationScheduler 514 may utilize a method (schedule) to instantiate a new thread for each executor/runner/MigrationWorker 516. The schedule method may be called by DatabaseUpdater 506. MigrationScheduler 514 may utilize a CountDownLatch (latch) to determine when the worker threads (of MigrationWorker 516) are complete. This latch may decrement the count when a MigrationWorker 516 completes their respective tasks. MigrationScheduler 514 may utilize a failed flag if any process failed. If the flag is triggered, all operations executed by the workers/runners are configured to roll back.

MigrationWorker 516 performs execution of the DDL statements on a session borrowed from the Relational Database Service (e.g., RDBService 518) from business logic 106 which may provide a database layer above database 112 that may use the JDBC database connections. MigrationWorker 516 may include a linked list of DBSchema 512 objects called ownlist containing DDL statements to be executed. The DDL statements to be executed may all be part of a common group of DDL statements that were determined not to be run in parallel as they reference common tables or refer to common tables. Each instance of MigrationWorker 516 may be associated with a dedicated connection and/or session leveraging off JDBC (utilizing a session SqlSession property). Auto-commit may be turned off on the JDBC connections allowing for a full session rollback in case any errors arise. MigrationWorker 516 may be configured to commit changes made when all statements have been executed.

Furthermore, each of the classes may include logging and error tracking to determine if any errors have occurred and to document any found errors.

Figure 6:
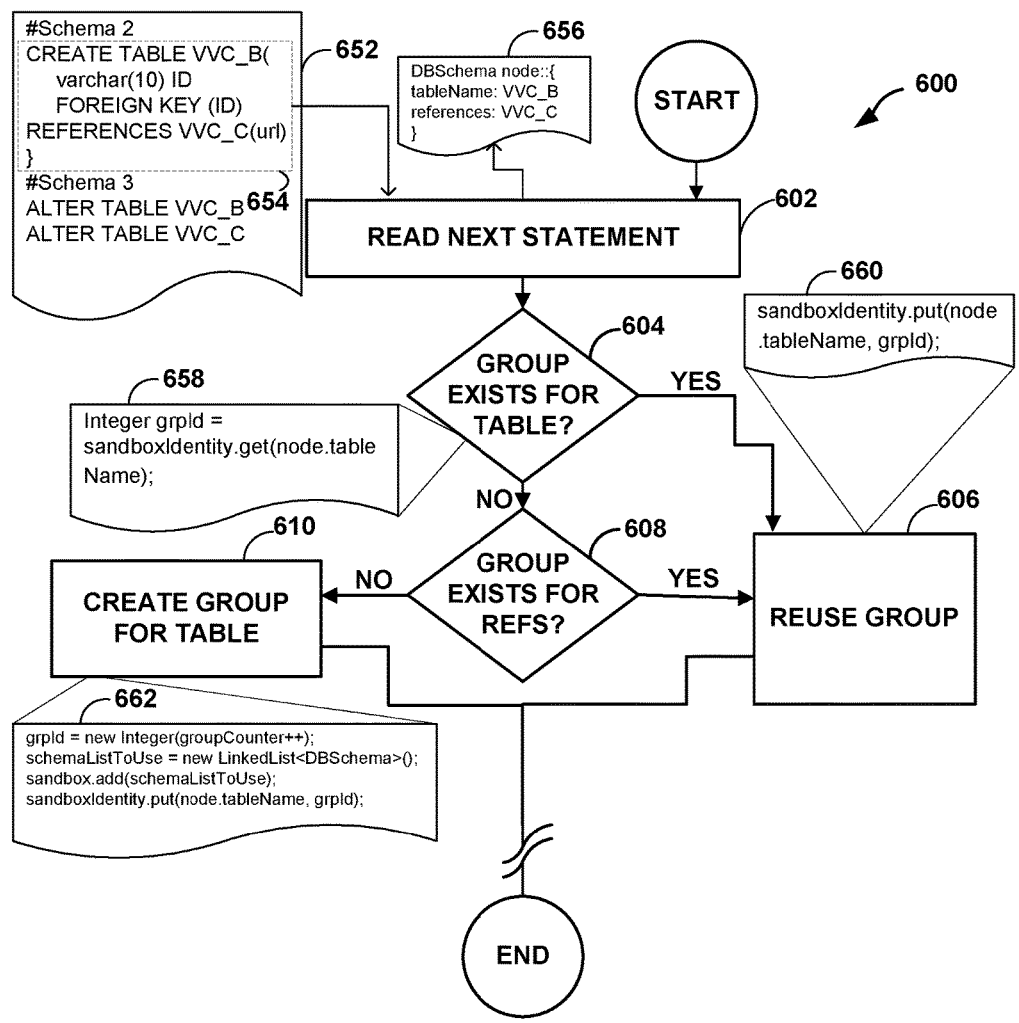
FIG. 6 is a flowchart further illustrating a portion of a method for dividing DDL statements into groups of FIG. 3, according to an illustrative example.

FIG. 6 is a flowchart further illustrating a portion of a method 600 for dividing DDL statements into groups of FIG. 3, according to an illustrative example. MEP 108 reads a next statement in a file containing DDL statements 652 (602). The statement is parsed and placed into DBSchema 512 instance node 656 by MEP 108. The tableName referenced in statement 654 is VVC_B, and statement 654 references table VVC_C. MEP 108 determines whether a group exists for the table VVC_B (604). Code snippet 658 may be used to determine a group identifier, if one exists, to see if table VVC_B has been associated with a group previously.

If the table VVC_B had been assigned a group previously (i.e., the value of grpID is a positive integer or not NULL) (604, yes branch), the previous group identifier is used by MEP 108 (606). Code snippet 660 is an example code segment that maps (via MEP 108) the group identifier (grpId, obtained via code snippet 658) to the current table (node.tableName) via the sandboxIdentity within SchemaNode 510.

If the table VVC_B had not been previously assigned a group, it is determined whether a group exists for any table that VVC_B references, by MEP 108 (608). If table VVC_B references another table that is currently assigned a group (608, yes branch), then that group will be reused (using code snippet 660) by MEP 108 (606). If none of the referenced tables have an assigned group, then a group is created for table VVC_B by MEP 108 (610). The group may be created via execution of code snippet 662 by MEP 108. Method 600 may then continue similarly to method 300.

Figure 7:
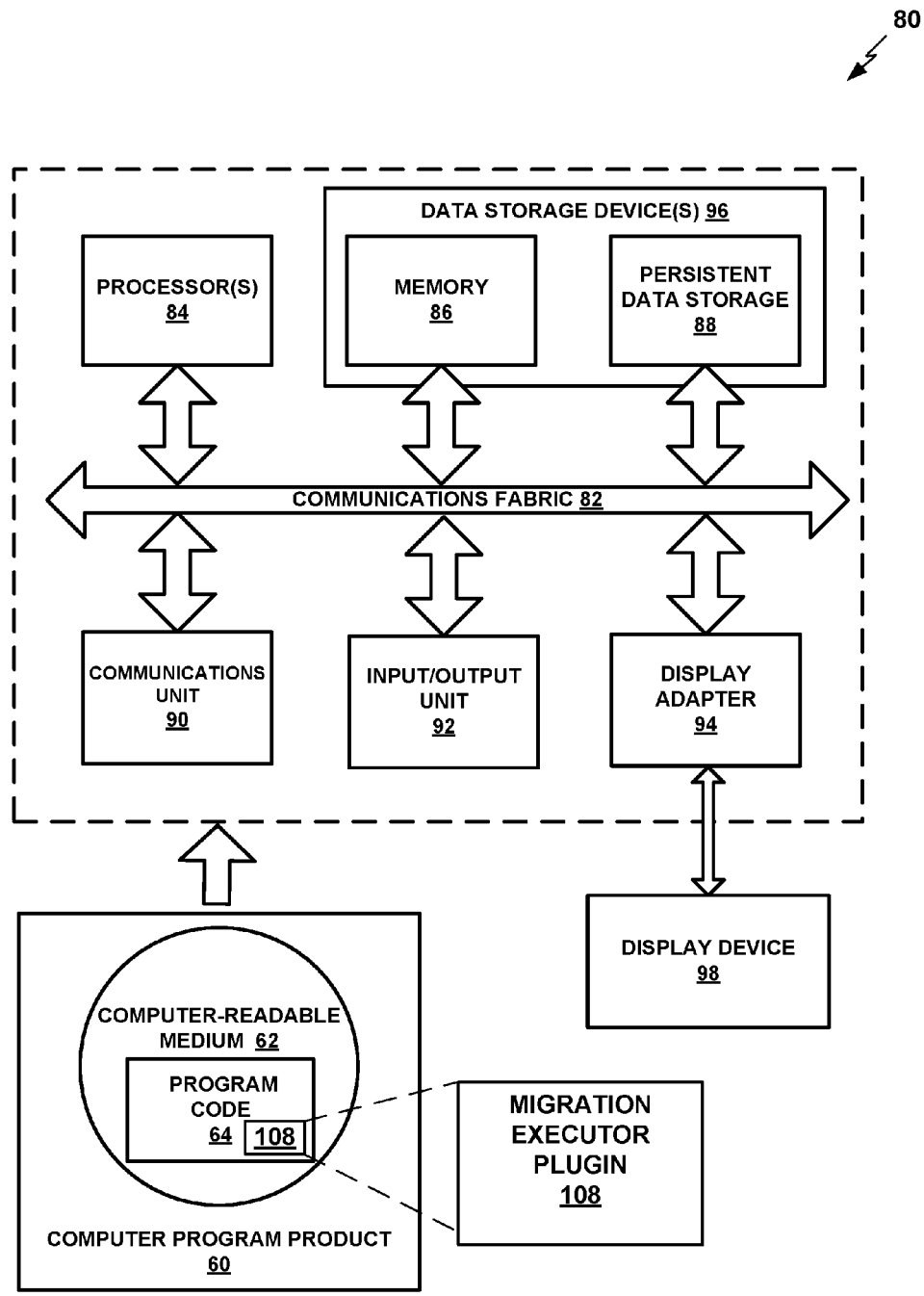
FIG. 7 is a block diagram of a computing device that may be used to execute a schema lifecycle manager, in one aspect of this disclosure.

FIG. 7 is a block diagram of a computing device 80 that may be used to execute MEP 108, in one aspect of this disclosure. Computing device 80 may be a server such as server 102 or whichever device can run the headless plugin 118 as depicted in FIG. 1. Computing device 80 may also be any server for providing an enterprise business intelligence application in various examples; including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 7, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a storage medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for MEP 108, as described in greater detail above. This program code may be stored on memory 86, persistent data storage 88, or elsewhere in computing device 80. This program code may also take the form of program code 64 stored on computer-readable storage medium 62 included in computer program product 60, and may be transferred or communicated, through any of a variety of local or remote means, from computer program product 60 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 60, which comprises a computer-readable medium 62 having computer program code 64 stored thereon. For example, computer program product 60 may be a CD-ROM, a DVD-ROM, a Blu-Ray disc, a magnetic disc, a USB stick, a flash drive, or an external hard disc drive, as illustrative examples, or any other suitable data storage technology.

Computer-readable storage medium 62 may include any type of optical, magnetic, or other physical medium that physically encodes program code 64 as a binary series of different physical states in each unit of memory that, when read by computing device 80, induces a physical signal that is read by processor 84 that corresponds to the physical states of the basic data storage elements of storage medium 62, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 64.

In some illustrative examples, program code 64 may be downloaded over a network to data storage 96 from another device or computer system for use within computing device 80. Program code 64 comprising computer-executable instructions may be communicated or transferred to computing device 80 from computer-readable storage medium 62 through a hard-line or wireless communications link to communications unit 90 and/or through a connection to input/output unit 92. Computer-readable storage medium 62 including program code 64 may be located at a separate or remote location from computing device 80, and may be located anywhere, including at any remote geographical location anywhere in the world, and may relay program code 64 to computing device 80 over any type of one or more communication links, such as the Internet and/or other packet data networks. The program code 64 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 64 may be transmitted from a source computer-readable storage medium 62 over non-tangible media, such as communications links or wireless transmissions containing the program code 64. Program code 64 may be more or less temporarily or durably stored on any number of intermediate physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
dividing, with one or more processing devices, a plurality of statements of a data definition language (DDL) script into a plurality of groups, the plurality of groups configured to be executed in parallel by a persistence layer;
removing, with the one or more processing devices, each statement of the plurality of statements of the DDL script from the respective group when the respective statement 1) counter-acts another statement in the same group as the respective statement, 2) includes objects not referenced by any other statement in the same group as the respective statement, and 3) does not make reference to another object in a second statement in the same group as the respective statement;
removing, with the one or more processing devices, one or more groups from the plurality of groups that are classified as non-operational groups to derive one or more operational groups, based at least in part on the dividing the plurality of statements of the DDL script into the plurality of groups, wherein the non-operational groups do not include any statements after the process of removing statements;
assigning, with the one or more processing devices, one or more of the one or more operational groups to a plurality of worker applications; and
executing, with the one or more processing devices, constituent statements of the plurality of statements of the DDL script within each operational group of the one or more operational groups by the plurality of worker applications in a session.

2. The method of claim 1 further comprising:
executing an application;
validating the persistence layer via comparing a version of the application and a version of a schema of the persistence layer; and
determining a range of delta increments between the version of the application and the version of the schema of the persistence layer from the DDL script.

3. The method of claim 2, further comprising: requesting, in response to the version of the application having a larger value than the version of the schema of the persistence layer, a migration application.

4. The method of claim 1, further comprising: borrowing, by a migration application, one or more database connections from an application.

5. The method of claim 4, further comprising: associating each database connection of the one or more database connections with a worker application of the plurality of worker applications.

6. The method of claim 1, wherein the DDL script is a universal DDL configured to be vendor agnostic,
wherein the method further comprises disambiguating the universal DDL to a vendor specific DDL script the vendor specific DDL script corresponding to a DDL associated with the persistence layer,
wherein dividing the plurality of statements of the DDL script into the plurality of groups comprises dividing the vendor specific DDL script into a plurality of groups, and wherein executing constituent statements of the plurality of statements of the DDL script comprises executing constituent statements of the plurality of statements of the vendor specific DDL script.

7. The method of claim 1, further comprising: committing changes made during the session, based at least in part on the executing of the constituent statements.

8. The method of claim 7, further comprising: converting a statement of the plurality of statements of the DDL script associated with removing a table into two statements, wherein the two statements comprise a statement configured to rename the table and, based on the committing changes made during the session, a statement configured to remove the renamed table.

9. The method of claim 1, wherein dividing the plurality of statements of the DDL script into the plurality of groups comprises:
for each statement of the plurality of statements of the DDL script;
determining whether a group exists for a table associated with the statement; and one of reusing the group in response to the group existing for the table associated with the statement or the group existing for a second table that references the table, or creating a new group in response to the group not existing for the table associated with the statement and the group not existing for the second table that references the table.

10. The method of claim 9, wherein the table is a first table, the method further comprising, for each statement of the plurality of statements of the DDL script, merging statements associated with a second table from a different group into the new group based on the first table referencing the second table and the second table being associated with the different group.

11. A computer program product comprising one or more non-transitory computer-readable storage media having program code embodied therewith, the program code executable by a computing device to:
divide a plurality of statements of a data definition language (DDL) script into a plurality of groups, the plurality of groups configured to be executed in parallel by a persistence layer;
remove each statement of the plurality of statements of the DDL script from the respective group when the respective statement 1) counter-acts another statement in the same group as the respective statement, 2) includes objects not referenced by any other statement in the same group as the respective statement, and 3) does not make reference to another object in a second statement in the same group as the respective statement;

remove one or more groups from the plurality of groups that are classified as non-operational groups to derive one or more operational groups, based at least in part on the dividing the plurality of statements of the DDL script into the plurality of groups, wherein the non-operational groups do not include any statements after the process of removing statements;

assign one or more of the one or more operational groups to a plurality of worker applications; and execute constituent statements of the plurality of statements of the DDL script within each operational group of the one or more operational groups by the plurality of worker applications in a session.

12. The computer program product of claim 11, wherein the program code is further executable by the computing device to:

execute an application;

validate the persistence layer via comparing a version of the application and a version of a schema of the persistence layer; and determine, a range of delta increments between the version of the application and the version of the schema of the persistence layer from the DDL script.

13. The computer program product of claim 11, wherein the program code is further executable by the computing device to:

borrow, by a migration application, one or more database connections from an application; and associate each database connection of the one or more database connections with a worker application of the plurality of worker applications.

14. The computer program product of claim 11, wherein the DDL script is a universal DDL configured to be vendor agnostic, wherein the program code is further executable by the computing device to disambiguate the universal DDL to a vendor specific DDL script, the vendor specific DDL script corresponds to a DDL associated with the persistence layer, wherein division of the plurality of statements of the DDL script into the plurality of groups comprises division of the vendor specific DDL script into a plurality of groups, and wherein execution of constituent statements of the plurality of statements of the DDL script comprises execution of constituent statements of the plurality of statements of the vendor specific DDL script.

15. The computer program product of claim 11, wherein the program code is further executable by the computing device to convert a statement of the plurality of statements of the DDL script associated with removal of a table into two statements, wherein the two statements comprise a statement configured to rename the table and, based on a commitment of changes made during the session, a statement configured to remove the renamed table.

16. A computer system comprising:

one or more processors, one or more computer-readable memories, and one or more computer-readable storage mediums;

program instructions, stored on at least one of the one or more computer-readable storage media for execution by at least one of the one or more processors via at least one of the one or more computer-readable memories, to divide a plurality of statements of a data definition language (DDL) script into a plurality of groups, the plurality of groups configured to be executed in parallel by a persistence layer;

program instructions, stored on at least one of the one or more computer-readable storage media for execution by at least one of the one or more processors via at least one of the one or more computer-readable memories, to remove each statement of the plurality of statements of the DDL script from the respective group when the respective statement 1) counter-acts another statement in the same group as the respective statement, 2) includes objects not referenced by any other statement in the same group as the respective statement, and 3) does not make reference to another object in a second statement in the same group as the respective statement;

program instructions, stored on at least one of the one or more computer-readable storage media for execution by at least one of the one or more processors via at least one of the one or more computer-readable memories, to remove one or more groups from the plurality of groups that are classified as non-operational groups to derive one or more operational groups, based at least in part on the dividing the plurality of statements of the DDL script into the plurality of groups, wherein the non-operational groups do not include any statements after the process of removing statements;

program instructions, stored on at least one of the one or more computer-readable storage media for execution by at least one of the one or more processors via at least one of the one or more computer-readable memories, to assign on or more of the one or more operational groups to a plurality of worker applications; and program instructions, stored on at least one of the one or more computer-readable storage media for execution by at least one of the one or more processors via at least one of the one or more computer-readable memories, to execute constituent statements of the plurality of statements of the DDL script within each operational group of the one or more operational groups by the plurality of worker applications in a session.

17. The computer system of claim 16, further comprising program instructions, stored on at least one of the one or more computer-readable storage media for execution by at least one of the one or more processors via at least one of the one or more computer-readable memories, to convert a statement of the plurality of statements of the DDL script associated with removal of a table into two statements, wherein the two statements comprise a statement configured to rename the table and, based on a commitment of changes made during the session, a statement configured to remove the renamed table.

18. The computer system of claim 16, wherein the program instructions to divide comprise program instructions to:

for each statement of the plurality of statements of the DDL script:

determine whether a group exists for a table associated with the statement;

in response to the determination that the group exists for the table associated with the statement or the group existing for a second table that references the table, reuse the group; and in response to the determination that the group fails to exist for the table associated with the statement and the group not existing for the second table that references the table, create a new group.

19. The computer system of claim 18, wherein the table is a first table, and wherein the computer system further comprises program instructions, stored on at least one of the one or more computer-readable storage media for execution by at least one of the one or more processors via at least one of the one or more computer-readable memories, to, for each statement of the plurality of statements of the DDL script, merge statements associated with a second table from a different group into the new group based on the first table referencing the second table and the second table being associated with the different group.

20. The computer system of claim 16, wherein the DDL script is a universal DDL configured to be vendor agnostic, and the system further comprising program instructions, stored on at least one of the one or more computer-readable storage media for execution by at least one of the one or more processors via at least one of the one or more computer-readable memories, to:
 disambiguate the universal DDL to a vendor specific DDL script, the vendor specific DDL script corresponding to a DDL associated with the persistence layer;
 divide the vendor specific DDL script into a plurality of groups; and
 execute constituent statements of the plurality of statements of the vendor specific DDL script.

* * * * *